TELEVISION ANTENNA

Filed April 11, 1952

2 SHEETS—SHEET 1

INVENTOR.
Elmer Guy Hills
BY
Mason, Kolehmainen, Rathburn & Wyss
Attorneys

Dec. 9, 1952

E. G. HILLS 2,621,293

TELEVISION ANTENNA

Filed April 11, 1952

2 SHEETS--SHEET 2

INVENTOR.
Elmer Guy Hills
BY
Mason, Kolehmainen, Rathburn & Wyss
Attorneys

Patented Dec. 9, 1952

2,621,293

UNITED STATES PATENT OFFICE 2,621,293

TELEVISION ANTENNA

Elmer Guy Hills, Des Plaines, Ill., assignor of one-half to Joseph N. Marks, Julius Tunkl, I. Rosenthal, and E. Lichtenstein, doing business as Tricraft Products Co., Chicago, Ill.

Application April 11, 1952, Serial No. 281,847

9 Claims. (Cl. 250—33)

The present invention relates to television antennas, and, more particularly, to television antennas suitable for indoor reception and capable of receiving television stations in both the high and low frequency television bands.

In general, the television antennas which are now employed for indoor installations fall into two general classifications. First, those which are contained within the cabinet of the television receiver, and second, those which are adapted to be placed on top of or near the television receiver cabinet. Indoor television antennas of the first general classification have the disadvantage that they cannot be oriented in a particular direction to optimize reception for a particular television station, unless the whole cabinet is rotated or unless a separate rotatable structure is provided for the antenna within the cabinet. On the other hand indoor television antennas of the second general classification have the disadvantage that they are unsightly, are not readily tunable or rotatable and are so large and unwieldly that they are completely out of place in the living room or other room where the television receiver is located. Furthermore, neither of these classes of indoor television antennas provide any appreciable control over the polarization of the antenna. The lack of control over the polarization of the antenna is particularly unsatisfactory in crowded city areas wherein the transmitted signal, which starts out as a horizontally polarized signal at the television transmitter, is considerably altered by building structures and room structures so that the actual signal presented to the television antenna is in many instances not a horizontally polarized wave.

It is a primary object of the present invention to provide a new and improved indoor television antenna wherein one or more of the above mentioned disadvantages are eliminated.

It is another object of the present invention to provide a new and improved television antenna which is adapted for indoor reception, which has an attractive appearance and is of relatively small physical dimensions and which may nevertheless be tuned to television stations in both the high and low frequency television bands.

It is still another object of the present invention to provide a new and improved television antenna which is adapted for indoor reception and is of relatively small physical dimensions and which may nevertheless be tuned to television stations in both the high and low frequency television bands by means of a single variable tuning element.

It is a further object of the present invention to provide a new and improved television antenna adapted for indoor installation wherein the antenna elements have an equivalent straight length which is less than a half wave length at the highest frequency in the high frequency television band.

It is a still further object of the present invention to provide a new and improved television antenna which is adapted for indoor installation and wherein means are provided for readily controlling the polarization as well as the orientation of the antenna.

It is still another object of the invention to provide a television antenna having the appearance of a conventional decorative object and in which conventionally arranged portions of the object form the antenna elements.

It is a further object of the present invention to provide a television antenna having the appearance of a miniature sailing vessel and in which the mast and boom of the vessel form the antenna elements.

Briefly, in accordance with one phase of the present invention, there is provided a vertical antenna element and a horizontal antenna element, the vertical and horizontal elements respectively forming the mast and boom of a miniature boat, the hull of which is formed of a ceramic material and supports the mast and boom antenna structure. The mast and boom antenna elements together act as a modified dipole antenna and are so proportioned that the equivalent straight length thereof is less than one half wave length at the highest frequency in the high frequency television band. The physical dimensions of the antenna elements and the ceramic hull of the boat are such that the "boat" antenna may readily be placed on top of the television receiver cabinet and is of suitably small size so that it does not tend to dwarf the television receiver or detract from the appearance thereof. Furthermore, the mast of the boat may be rotated without detuning the antenna to orient the same for best reception.

In accordance with a further phase of the invention, an impedance matching network is enclosed within the hollow ceramic hull of the boat and is connected to the mast and boom antenna elements so that the antenna may be tuned to stations in both the high and low frequency television bands and a transmission line is employed to connect the impedance matching network to the input terminals of the receiver so that a compact, readily tunable rotatable indoor television antenna is provided.

The invention, both as to its organization and method of operation, together with other and further objects and advantages thereof, will best be understood by reference to the following specification taken in connection with the accompanying drawings, in which.

Figures 1, 2, 3, 4, 5:
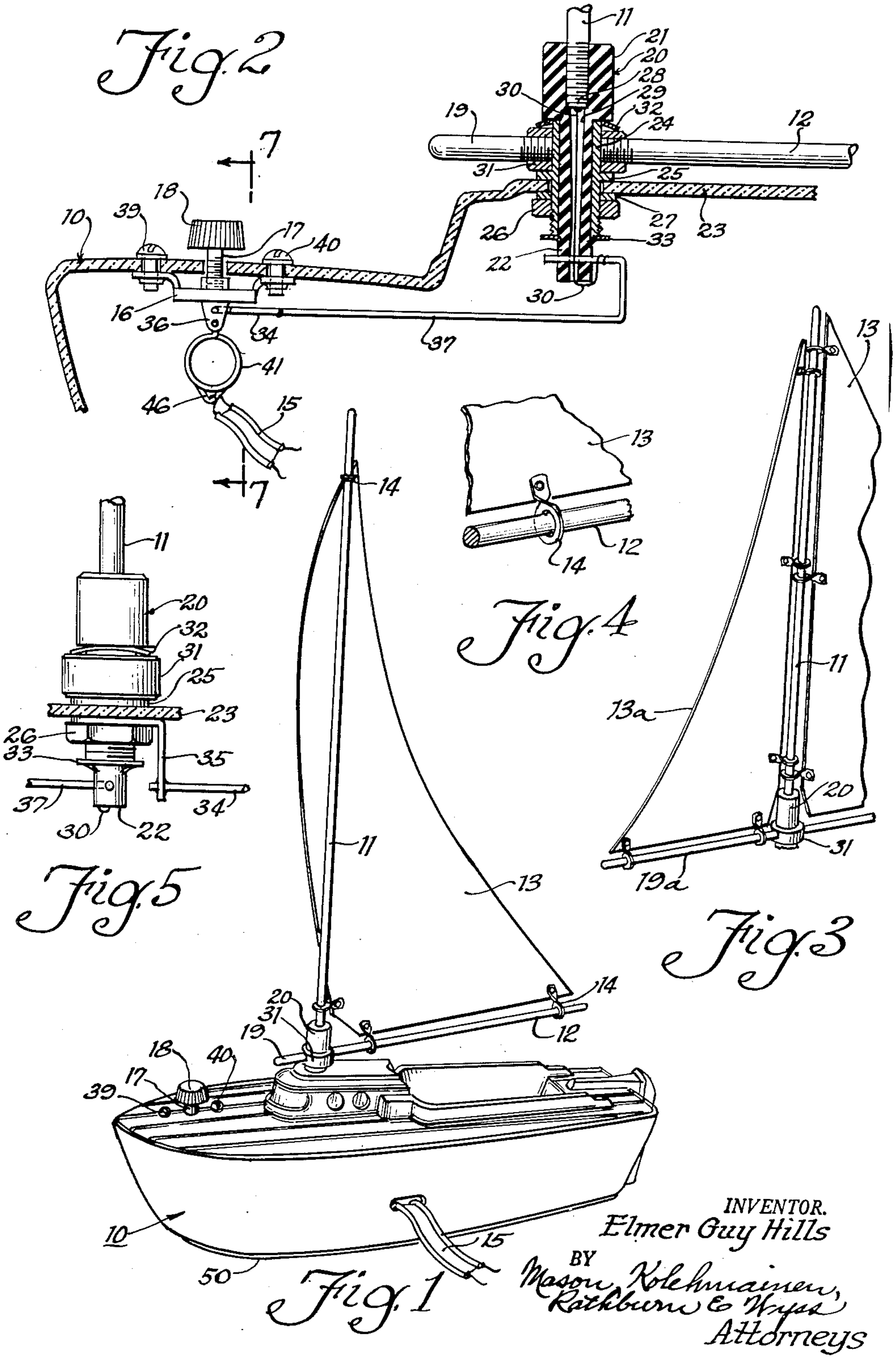
Fig. 1 is a perspective view of a television antenna embodying the present invention.
Fig. 2 is a fragmentary side elevational view, partly in section, taken along the center line of the boat structure of the antenna shown in Fig. 1.
Fig. 3 is a perspective view of an alternative arrangement of the boat structure of Fig. 1.
Fig. 4 is a detailed perspective view of the sail fastening means employed in the boat structure of Fig. 1.
Fig. 5 is a side elevational view of the mast supporting structure taken along the lines 5—5 of Fig. 6.
Figure 6:
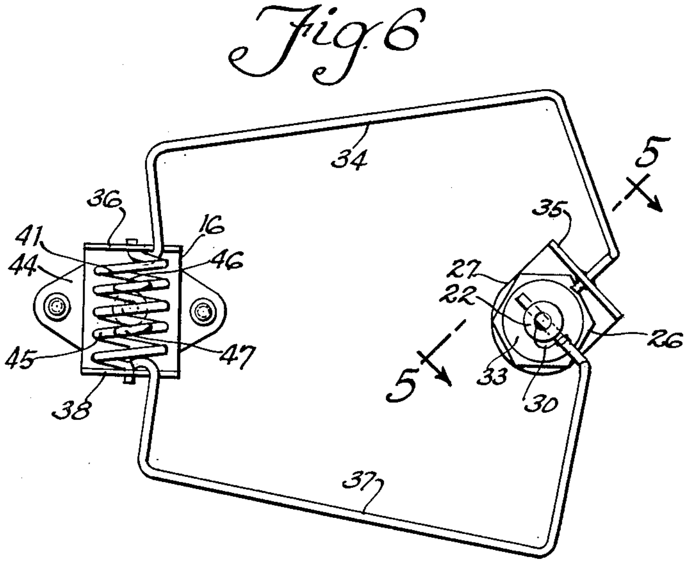
Fig. 6 is a bottom view of the below deck structure of the antenna of Fig. 1.
Figure 7:
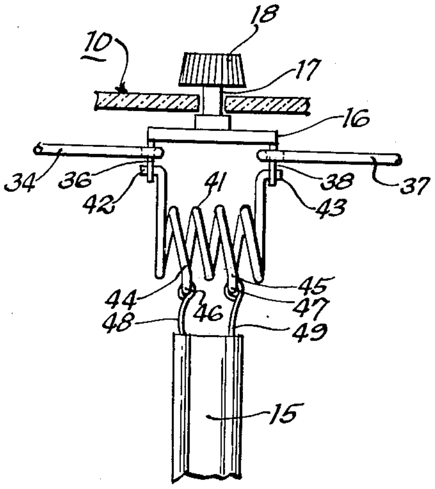
Fig. 7 is a side elevational view taken along the lines 7—7 of Fig. 2.

Referring now more particularly to the drawings, the television antenna of the present invention comprises a ceramic base member, indicated generally at 10, which is in the form of a hollow open-bottomed hull of a boat, in the illustrated embodiment a sailboat, and supports a vertical conductive antenna element 11, which forms the mast of the boat, a horizontal conductive antenna element 12, which forms the boom of the boat, and a sail 13 of any suitable material such as plastic, paper or the like, which is secured to the "mast" and "boom" antenna elements 11, 12 by means of the eyelets 14.

The antenna elements 11 and 12 together form the two halves of a center fed antenna which is similar to a center fed dipole antenna. However, contrary to the conventional dipole antenna, the elements 11 and 12 are positioned at right angles to each other. Also, contrary to the conventional dipole antenna the antenna elements have an equivalent straight length which is less than a half wavelength of the highest frequency received by the antenna. Electrical connection to the antenna elements 11 and 12 is made within the hollow hull 10 by means of an impedance matching network which is positioned within the hull and connects the elements 11 and 12 to the transmission line 15, the transmission line 15 extending through the side of the hull 10 and being connected to the input terminals of the associated television receiver. The impedance matching network includes as the sole variable element thereof a variable condenser 16, preferably of the book type, the shaft 17 of which extends upwardly through the deck portion of the hull 10 and a control knob 18, positioned on the shaft 17 outside the hull 10, is provided so that the tuning of the antenna elements 11 and 12 may be varied by rotation of knob 18. The "boom" antenna element 12 is adapted for rotation by means to be described in more detail hereinafter and an insulating stud 19 is provided which extends forwardly of the mast in line with the antenna element 12 so that the "boom" antenna element 12 may be manually rotated throughout a full 360° without detuning the antenna elements 11 and 12. Accordingly, the "boom" antenna element 12 may be rotated by manipulation of the insulated stud 19 to change the direction of reception of the antenna and the tuning of the antenna may be changed to a particular station by manipulation of the knob 18. In this connection, it will be understood that suitable indicia marks (not shown) may be inscribed or otherwise imprinted upon the deck of the hull 10 adjacent the knob 18 to identify the particular television channel to which the antenna is tuned. Also, a suitable cover 50, of cardboard, felt or other suitable material is glued or otherwise secured to the open bottom of the hull 10 to conceal the electrical components therein and prevent tampering therewith. Furthermore, the stud 19 may be extended to form a jib boom 19*a*, as clearly shown in Fig. 3 and a jib sail 13*a* may be supported by means of the eyelets 14 from the mast, element 11 and the jib boom 19*a*. The eyelets 14 (Fig. 4) may be conveniently formed by employing a conventional flat metal terminal, the tab of which is secured to the sail by means of a hollow rivet and is given a quarter twist to position the eyelet at right angles to the sail so that it may be inserted over the mast or boom elements.

Referring now more particularly to the mast and boom structure whereby the antenna elements 11 and 12 are supported in the manner described above while permitting electrical connection to be made thereto the vertical antenna element 11 is threaded into the top of an insulator 20, preferably of polystyrene or other suitable insulating material, the insulator 20 having an enlarged head portion 21 and a shank portion 22 which extends through the upper deck 23 of the hull 10 inside the bore of a conductive bushing 24. The bushing 24 is provided with the flange 25 which engages the upper surface of the deck portion 23 and a nut 26 is threaded onto the lower end of the bushing 24 so as to secure the bushing to the deck portion 23. A terminal member 27 is clamped between the nut 26 and the under surface of the deck portion 23 and makes electrical contact with the bushing 24.

In order to make electrical contact to the antenna element 11 from the interior of the hull 10, the insulator 20 is provided with a tapered bore 29 and a relatively fine wire 30 is connected by any suitable means, such as soldering or the like, to a terminal member 28 positioned at the bottom of the threaded opening in the insulator 20, and extends through the bore 29 of the insulator 20 to the interior of the hull 10. The wire 30 exercises a spring loading action on the terminal 28 so that good electrical contact to the element 11 is assured when this element is threaded into the top of the bushing 20.

To support the antenna element 12 for rotation about the element 11, while permitting electrical connection to be made thereto, there is provided a conductive collar 31 which is positioned on the bushing 24 and seats on the flange 25 thereof, a spring washer 32 being positioned between the shoulder of the insulator 20 and the collar 31 to maintain electrical contact between the collar 31 and the flange 25 as the antenna element 12 is rotated. The washer 32 also operates to maintain the element 12 in position once it is adjusted. The insulator 20 is also prevented from moving upwardly by means of a shakeproof fastener 33 which is positioned around the shank portion 22 of the insulator 20 and engages the bottom edge of the bushing 24. The conductive "boom" antenna element 12 is threaded into one side of the collar 31 and the insulating stud 19 is threaded into the other side.

In order to match the antenna elements 11 and 12 to a suitable load impedance, such as the conventional 300 ohm transmission line 15, there is provided an impedance matching network having as the sole variable element thereof, the variable condenser 16. This impedance matching network includes a first inductance element 34 which is connected at one end to the depending tab portion 35 of the terminal 27 and is connected at the other end thereof to one terminal 36 of the variable condenser 16. The impedance matching network further comprises a second inductance element 37 which is supported at one end thereof on the shank 22 of the insulator 20 by passing the end of the element 37 through a transverse opening in the shank 22. The fine wire 30, which extends through the insulator 20, is electrically connected to the end of the inductance element 37 by wrapping the wire 30 around the adjacent portion of the element 37 and soldering the wire 30 thereto. The other end of the element 37 is connected to the other terminal 38 of the variable condenser 16. The inductance elements 34 and 37 are preferably in the form of relatively heavy wires so that they maintain the shape and spacing shown in the drawing when supported at the ends thereof in the manner described immediately above. Furthermore, by passing the end of the element 37 through the insulator shank 22, the insulator 20 is prevented from rotating so that the mast element 11 and insulator 20 remain fixed as the boom element 12 is rotated to orient the antenna for best reception. In this connection it will be understood that the elements 34 and 37, when formed in the manner shown in the drawings, possess sufficient inductance to permit matching of the antenna elements to the transmission line 15, as will be described in more detail hereinafter.

The variable condenser 16 is secured to the hull 10 by any suitable means such as the screws 39 and 40, and an impedance matching autotransformer 41 is connected between the terminals 36 and 38 of the condenser 16. The autotransformer 41 is in the form of a plural turn coil of relatively heavy wire, the ends of this coil being turned outwardly as indicated at 42 and 43 to connect to the terminals 36 and 38 of the condenser 16. In order to match the antenna impedance to the 300 ohm transmission line 15, this line is connected to spaced points intermediate the ends of the autotransformer 41. For example, the turns 44 and 45 of the autotransformer 41 may be provided with outwardly deformed loop portions 46 and 47 to which the conductors 48 and 49 of the transmission line 15 are connected by soldering or the like. In this connection it will be understood that the condenser 16 may be located at any convenient point in the hull 10 provided the inductance elements 34 and 37 are of the correct length and spacing to provide the necessary inductance. For example, the condenser 16 may be located with the shaft thereof extending into the cockpit of the hull 10 and a steering wheel may be used in place of the knob 18 to rotate the shaft of the condenser.

From the foregoing description it will be seen that the antenna is particularly adapted for shipment and storage in knockdown form and may be easily assembled by the customer without the use of special tools or electrical equipment. Thus, the hull 10, the mast 11, the boom 12 and the sail 13 may be packed separately and sold as a small kit. The customer inserts the mast element 11 into the insulator 20 and tightens it and then slips the sail eyelets 14 over the mast 11. The boom 12 is then slipped through the eyelets 14 and threaded into the collar 31. The hull 10 may then be placed on the top of the television receiver cabinet or on any convenient article of furniture and the transmission line 15 is connected to the antenna terminal of the television receiver.

Figure 8:
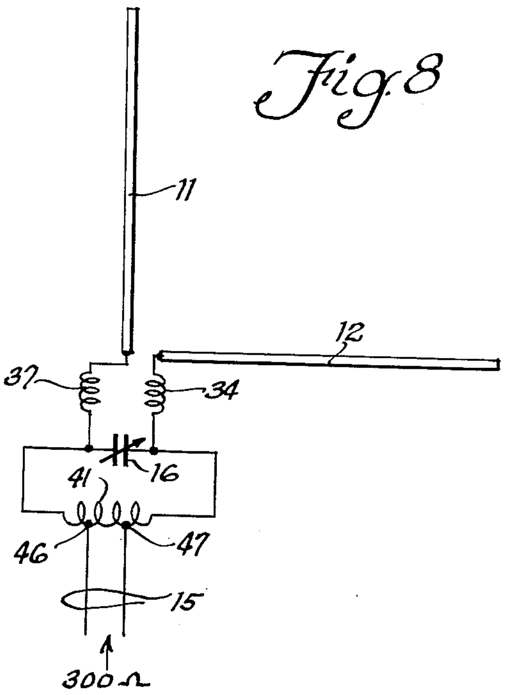
Fig. 8 is a schematic circuit diagram of the antenna of Fig. 1.

From the foregoing description of the television antenna of the present invention, it will be evident that the electrical circuit (Fig. 8) of the antenna comprises the vertical element 11, the horizontal element 12 the inductance elements 37 and 34, respectively connected to the antenna elements 11 and 12, the variable condenser 16, which is connected across the other ends of the inductance elements 34 and 37, and the autotransformer 41, to which the transmission line 15 is connected at the balanced points 46 and 47.

Considering now the operation of the television antenna system described above, the antenna elements 11 and 12 are of relatively short length such that the equivalent straight length of these elements is less than a half wave-length at the highest frequency television band. In actual practice it has been found that the "mast" element 11 may be only 17 inches long and the "boom" element 15½ inches long and still provide good reception in both the low frequency television band of 54 to 88 megacycles and the high frequency television band of 174 to 216 megacycles. In the low frequency television band, the equivalent impedance of the antenna elements 11 and 12 comprises a very low resistance in series with a relatively large capacitive reactance. Also,, in the low frequency television band, the inductance elements 34 and 37 are of sufficiently low inductance that they have almost negligible effect upon the tuning of the antenna elements 11 and 12. Accordingly, the variable condenser 16, the capacitive reactance of the antenna elements 11 and 12 and the inductance of the autotransformer 41 comprises a first parallel resonant circuit which may be tuned to any particular station within the low frequency television band by adjustment of the variable condenser 16. When this first parallel resonant circuit is tuned to resonance there results a high impedance across the circuit which is essentially resistive in character. This relatively high resistive impedance is stepped down by means of the autotransformer 41 so that an impedance of approximately 300 ohms is seen at the tapped points 46 and 47 on the autotransformer 41. Since the resonant impedance of this first parallel resonant circuit remains substantially constant although the circuit is tuned to different television stations within the low frequency television band, it will be evident that the antenna elements 11 and 12 will remain matched to the 300 ohm transmission line 15 over the entire low frequency television band.

In the high frequency television band, the impedance of the antenna elements 11 and 12 is no longer equivalent to a low resistance in series with a relatively large capacitive reactance but instead is equivalent to a resistor of approximately 72 ohm in series with a very low capacitive reactance. Accordingly, in the high frequency television band the antenna elements do not comprise a reactance which when shunted by any possible variable condenser can provide a parallel resonant circuit with high impedance at resonance. However, a high resonant impedance is necessary because the autotransformer 41 steps down the impedance by a fixed ratio which is dictated by the requirements in the low frequency television band so that a 300 ohm impedance results in the low frequency television band. In accordance with the present invention these conflicting requirements are resolved by providing the inductance elements 34 and 37 which are connected in series with the antenna elements 11 and 12 to form a series resonant circuit which has an equivalent inductive reactance in the high frequency television band. By providing the inductance elements 34 and 37, the equivalent capacitive reactance of the antenna elements 11 and 12 becomes an inductive reactance for frequencies in the high frequency television band and this inductive reactance, together with the condenser 16 and the autotransformer 41 form a second parallel circuit which may be resonated at different frequencies in the high frequency television band and provides a high parallel resonant impedance which is resistive. The resonant impedance of this second parallel resonant circuit when transformed by the coil 41, again results in an impedance of approximately 300 ohm at the output terminals 46 and 47 so that the antenna elements 11 and 12 remain matched to the transmission line 15 over the entire high frequency television band.

In accordance with an important feature of the present invention, the inductance values of the inductance elements 34 and 37 are such that they resonate with the capacitive reactance of the antenna elements 11 and 12 at a frequency substantially midway between the high and low frequency television bands, i. e. at a frequency of approximately 130 megacycles. At this frequency the impedance of this series resonant circuit, which is placed across the condenser 16, is practically a short circuit due to the fact that the elements 34 and 37 and the antenna elements 11 and 12 are series resonant at this frequency. However, this mismatch occurs between bands and does not affect the tuning of the antenna within the high and low frequency television bands. Furthermore, by choosing the series resonant frequency below the upper frequency band the equivalent reactance of this series resonant circuit is inductive throughout the high frequency television band so that the second parallel resonant circuit described above may be resonated throughout the high frequency television band.

In order to provide a sufficiently high impedance parallel resonant circuit in the high frequency television band, it is necessary that the inductance elements 34 and 37 have an inductive reactance in this band which is higher than the equivalent 72 ohm resistor presented by the antenna elements 11 and 12. Accordingly, the inductance value of the elements 34 and 37 is determined by these considerations so that these elements have an inductive reactance which is higher than 72 ohm for frequencies in the high frequency television band. On the other hand, it is necessary that the inductance elements 34 and 37 be series resonant with the antenna elements 11 and 12 at a frequency midway between the high and low frequency television bands. This means that the antenna elements 11 and 12 must have a relatively high capacitive reactance, i. e. relatively small capacity therebetween, in order to resonate with the inductance elements 34 and 37 at a frequency between the television bands. As a result, the effective length of the antenna elements 11 and 12 must be less than a half wave length even at the highest frequency in the high frequency television band, otherwise the capacity between the antenna elements 11 and 12 will be too great to permit these elements to be resonated with the inductance elements 34 and 37 at the mid-point frequency. The capacity between the elements 11 and 12 is further reduced in accordance with the present invention by providing the polystyrene insulator 20 which has a low dielectric constant, and the relatively fine wire 30 so that the distributed capacity in the mast structure is kept as low as possible. In this connection it will be noted that the electrical requirement that the antenna elements 11 and 12 be very short is compatible with the desire to provide an indoor television antenna of as small physical dimensions as possible.

In accordance with a further important feature of the present invention, the provision of antenna elements 11 and 12 which are positioned at right angles to each other provides some measure of control over the polarization of the antenna. In many buildings the originally horizontally polarized radiation of the television transmitter is considerably altered by the building structure so that the polarization of the signal is changed from the horizontal. In the antenna system of the present invention, a signal polarized parallel to the hypotenuse of the right triangle formed by the elements 11 and 12 is received best, whereas a signal polarized perpendicular to this hypotenuse is not received at all. Accordingly, the antenna system provides two choices of polarization for each horizontal direction of best reception; one polarization being obtained with the "boom" antenna element 12 being rotated 180° from the best position for reception of the other polarization, although the direction of arrival of the signals in both cases is the same. In this connection it will be understood that no control of polarization is possible in a conventional half wave length dipole, since a dipole rotation of 180° produces no effect on the reception pattern or the polarization of the antenna.

In view of the foregoing, it will be evident that the present invention provides a television antenna which is adapted for indoor installation wherein the antenna elements are less than one half wave length at the highest frequency in the high frequency television band so that the overall physical dimensions of the antenna are extremely small, and an impedance matching network having only one variable element is provided for matching the antenna to a standard transmission line over both the high and low frequency television bands. Furthermore, the antenna may readily be oriented for best reception without producing detuning of the antenna and the polarization of the antenna may be controlled as well as the orientation thereof.

While there has been described what are at present considered to be the preferred embodiments of the invention, it will be understood that various modifications may be made therein which are within the true spirit and scope of the invention as defined in the appended claims.

What is desired to be secured by Letters Patent of the United States is:

1. An indoor television antenna, comprising a base of insulating material in the form of the hull of a boat, a conductive mast supported on said base, a conductive boom supported for rotation about said mast in a substantially horizontal plane, means for establishing electrical connections to said mast and boom while permitting rotation of said boom about said mast, said mast and boom comprising all of the receiving elements of said antenna and both cooperating effectively to form a dipole, a load impedance, and an impedance matching network for matching said mast and boom to said load impedance over both the high and low frequency television bands.

2. An indoor television antenna, comprising a hollow base member of insulating material in the form of the hull of a boat, a hollow conducting bushing extending through a wall of said base member, an insulator positioned atop said conductive bushing and having a vertical bore extending therethrough, a vertical conductive mast rod threaded into said insulator from the top, a conductive collar seated on said conductive bushing between said insulator and said base member, a conductive boom rod threaded into one side of said collar and extending away from said mast rod substantially at right angles thereto, said mast and boom rods together acting as a dipole antenna, a first inductance element connected at one end to said bushing inside said base member, a second inductance element connected at one end to said conductive mast rod through the bore of said insulator, a variable condenser positioned inside said base member and connected to the other ends of said inductance elements, said condenser having a shaft extending through a wall of said base member for adjustment of said condenser, a coil connected across said condenser, a transmission line connected to said coil at balanced points thereon and means including an insulating member threaded into said collar for rotating said boom rod without electrically detuning said mast and boom rods.

3. An indoor television antenna, comprising a hollow base member of insulating material in the form of the hull of a boat, a hollow conductive bushing extending through a wall of said base member, an insulator positioned atop said conductive bushing and having a vertical bore extending therethrough, a vertical conductive mast element threaded into said insulator from the top, a conductive collar seated on said conductive bushing between said insulator and said base member and rotatable about said bushing, a conductive boom element threaded into one side of said collar and extending away from said mast element substantially at right angles thereto, said mast and boom elements together acting as a dipole antenna having an equivalent straight length which is less than a half wave length at a frequency of 216 megacycles, a first inductance element connected at one end to said bushing inside said base member, means including a wire extending through the bore of said insulator for making electrical connection to said mast element, a second inductance element connected at one end to said wire inside said base member, a variable condenser positioned inside said base member and connected to the other ends of said inductance elements, said condenser having a shaft extending through a wall of said base member for adjustment of said condenser, a coil connected across said condenser, a transmission line connected to said coil at balanced points thereon and means including an insulating stud threaded into said collar for rotating said boom element without detuning said mast and boom elements.

4. A miniature boat adapted to be placed on the top of a television receiver cabinet, said boat having a conductive mast element and a conductive boom element, said mast and boom elements together acting as a dipole antenna, means including an insulating stud connected to said boom for rotating said boom about the axis of said mast without detuning said mast and boom elements, and means including an impedance matching network for connecting said mast and boom elements to the input terminals of the television receiver, said impedance matching network including a variable condenser for tuning said mast and boom elements to stations in both the high and low frequency television bands.

5. An indoor television antenna, comprising a base of insulating material in the form of the hull of a boat, a conductive mast supported on said base, a conductive boom supported for rotation about said mast at the base thereof, means for establishing electrical connections to said mast and boom while permitting rotation of said boom about said mast, said mast and boom comprising all of the receiving elements of said antenna and both cooperating effectively to form a dipole, and means including a jib boom of insulating material extending forwardly of said mast for rotating said boom without electrically detuning said mast and boom antenna elements.

6. An indoor television antenna, comprising a base of insulating material, a vertically disposed conductive member supported on said base, a horizontally disposed conductive member supported for rotation about said vertical member, means for establishing electrical connections to both said members while permitting rotation of one member relative to the other, said two members comprising all of the receiving elements of said antenna and both cooperating effectively to form a dipole, and an insulating member connected to said horizontal member for rotating the same without electrically detuning said two member antenna elements.

7. An indoor television antenna, comprising a hollow base member of insulating material, a hollow conductive bushing extending through a wall of said base member, an insulator positioned atop said conductive bushing and having a vertical bore extending therethrough, a vertical conductive rod threaded into said insulator from the top, a conductive collar seated on said conductive bushing between said insulator and said base member, a conductive rod threaded into one side of said collar and extending away from said vertical rod substantially at right angles thereto, said rods together acting effectively as a dipole antenna, a first inductance element connected at one end to said bushing inside said base member, a second inductance element connected at one end to said vertical conductive rod through the bore of said insulator, a variable condenser positioned inside said base member and connected to the other ends of said inductance elements, said condenser having a shaft extending through a wall of said base member for adjustment of said condenser, a coil connected across said condenser, and a transmission line connected to said coil at balanced points thereon.

8. An indoor television antenna, comprising a hollow base member of insulating material, a hollow conductive bushing extending through a wall of said base member, an insulator positioned atop said conductive bushing and having a vertical bore extending therethrough, a vertical conductive element threaded into said insulator from the top, a conductive collar seated on said conductive bushing between said insulator and said base member and rotatable about said bushing, a conductive element threaded into one side of said collar and extending away from said vertical element substantially at right angles thereto, said elements together acting effectively as a dipole antenna, a first inductance element connected at one end to said bushing inside said base member, means including a wire extending through the bore of said insulator for making electrical connection to said vertical element, a second inductance element connected at one end to said wire inside said base member, a variable condenser positioned inside said base member and connected to the other ends of said inductance elements, said condenser having a shaft extending through a wall of said base member for adjustment of said condenser, a coil connected across said condenser, and a transmission line connected to said coil at balanced points thereon.

9. An indoor television antenna, comprising a hollow base member of insulating material, a hollow conductive bushing extending through a wall of said base member, an insulator positioned atop said conductive bushing and having a vertical bore extending therethrough, a vertical conductive element threaded into said insulator from the top, a conductive collar seated on said conductive bushing between said insulator and said base member and rotatable about said bushing, a conductive element threaded into one side of said collar and extending away from said vertical element substantially at right angles thereto, said elements together acting effectively as a dipole antenna, a first inductance element connected at one end to said bushing inside said base member, means including a wire extending through the bore of said insulator for making electrical connection to said vertical element, a second inductance element connected at one end to said wire inside said base member, said second inductance element comprising a formed wire having said one end thereof extending through said insulator inside said base member to prevent said insulator from turning as said horizontal element is rotated, a variable condenser positioned inside said base member and connected to the other ends of said inductance elements, said condenser having a shaft extending through a wall of said base member for adjustment of said condenser, a coil connected across said condenser, and a transmission line connected to said coil at balanced points thereon.

ELMER GUY HILLS.

REFERENCES CITED

The following references are of record in the file of this patent:

UNITED STATES PATENTS

| Number | Name | Date |
|---|---|---|
| 1,863,518 | Young | June 14, 1932 |
| 2,093,886 | Hahnemann | Sept. 21, 1937 |
| 2,168,857 | Barbour | Aug. 8, 1939 |
| 2,259,628 | Fener et al. | Oct. 21, 1941 |
| 2,422,026 | Luck | June 10, 1947 |
| 2,532,138 | Atchison | Nov. 28, 1950 |
| 2,558,487 | Hills | June 26, 1951 |
| 2,582,159 | Race | Jan. 8, 1952 |

FOREIGN PATENTS

| Number | Country | Date |
|---|---|---|
| 666,266 | Great Britain | Feb. 6, 1952 |

OTHER REFERENCES

Radio and Television Retailing, September 1949, page 87.